(No Model.)  4 Sheets—Sheet 1.
W. E. WEATHERLY.
PROCESS OF AND APPARATUS FOR TREATING PEANUTS.
No. 574,647. Patented Jan. 5, 1897.
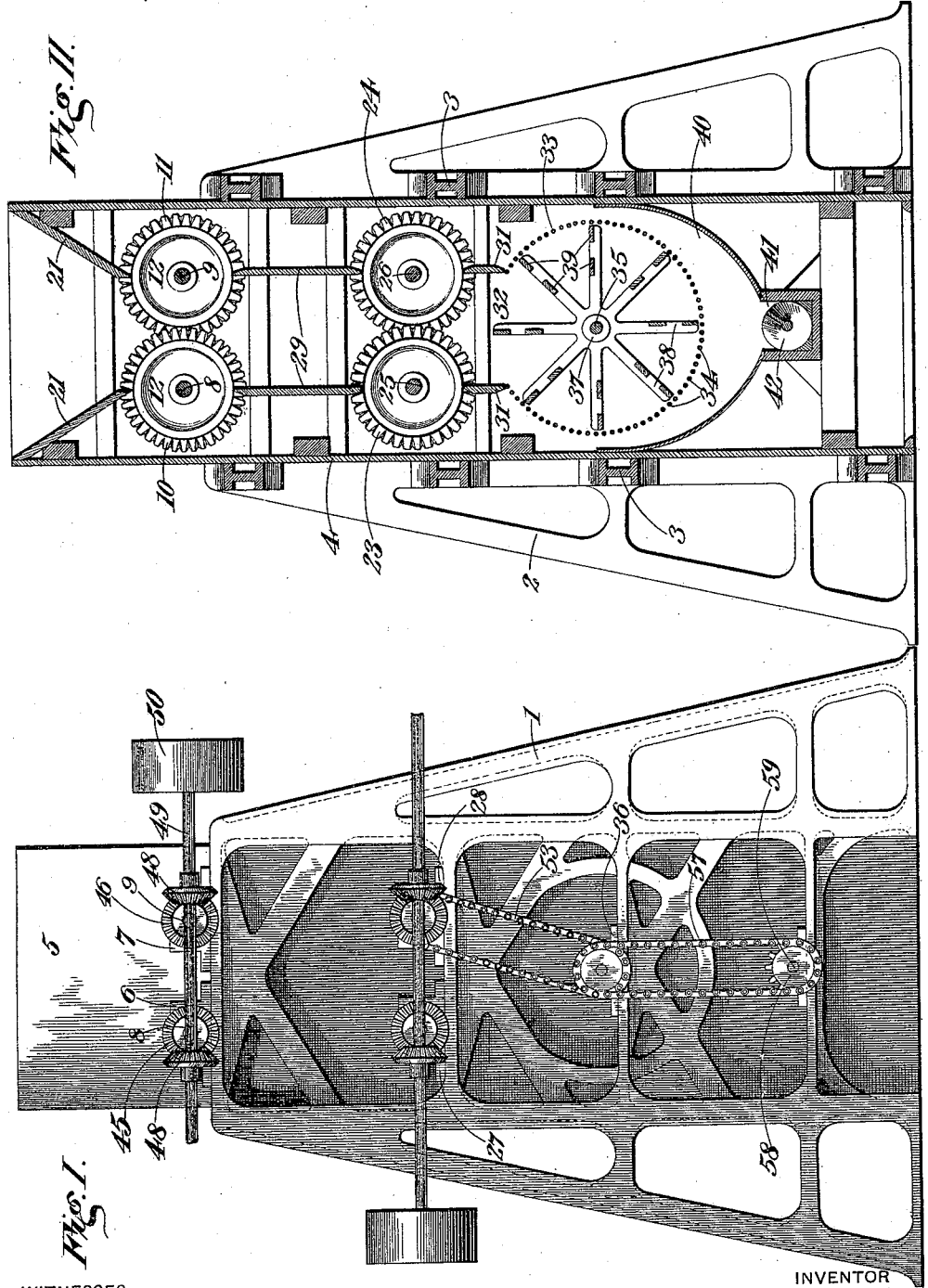
WITNESSES  
INVENTOR  
Wilson E. Weatherly  
By Joseph L. Atkins  
Attorney (No Model.) 4 Sheets—Sheet 2.
W. E. WEATHERLY.
PROCESS OF AND APPARATUS FOR TREATING PEANUTS.
No. 574,647. Patented Jan. 5, 1897.
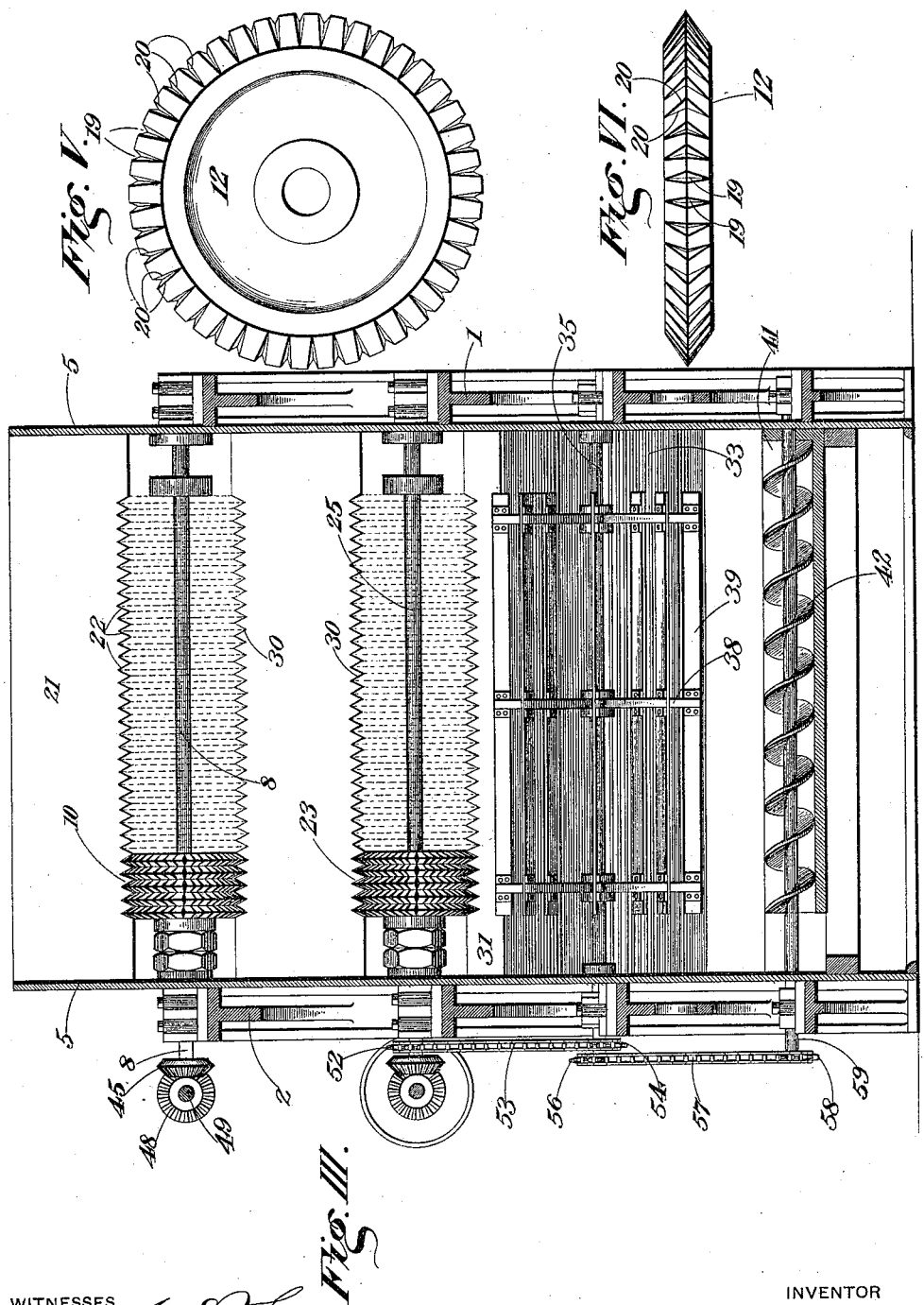

(No Model.) 4 Sheets—Sheet 3.
W. E. WEATHERLY.
PROCESS OF AND APPARATUS FOR TREATING PEANUTS.
No. 574,647. Patented Jan. 5, 1897.
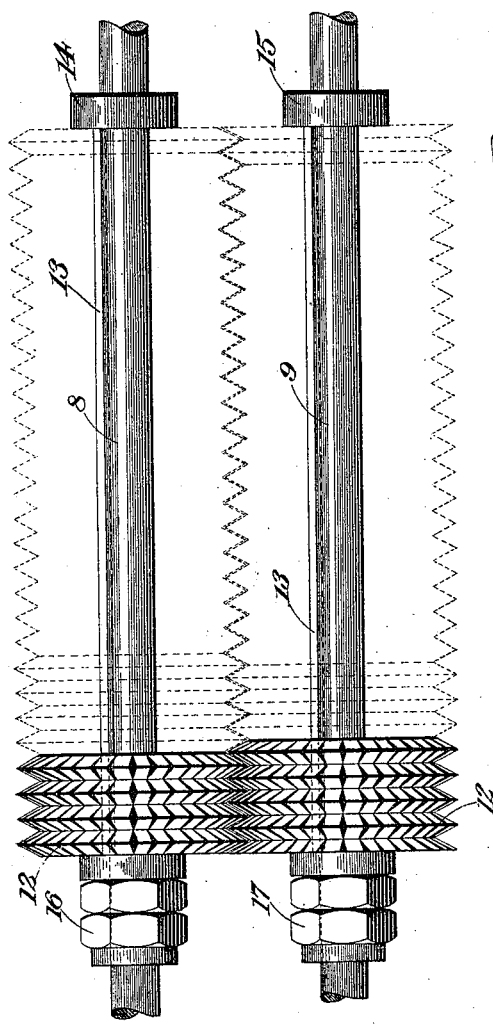
Fig. IV.
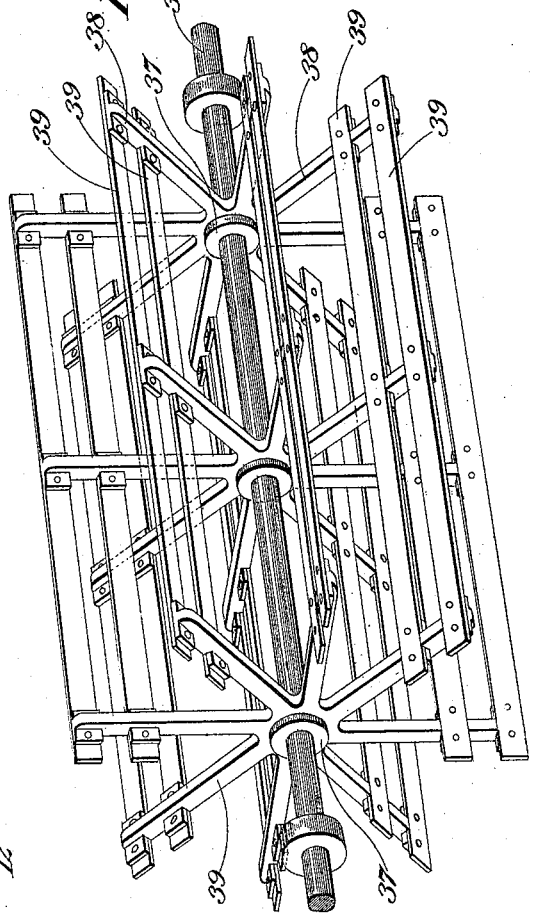
Fig. VII.
WITNESSES
INVENTOR
Wilson E. Weatherly
By Joseph L. Atkins
Attorney.

(No Model.) 4 Sheets—Sheet 4.
W. E. WEATHERLY.
PROCESS OF AND APPARATUS FOR TREATING PEANUTS.
No. 574,647. Patented Jan. 5, 1897.
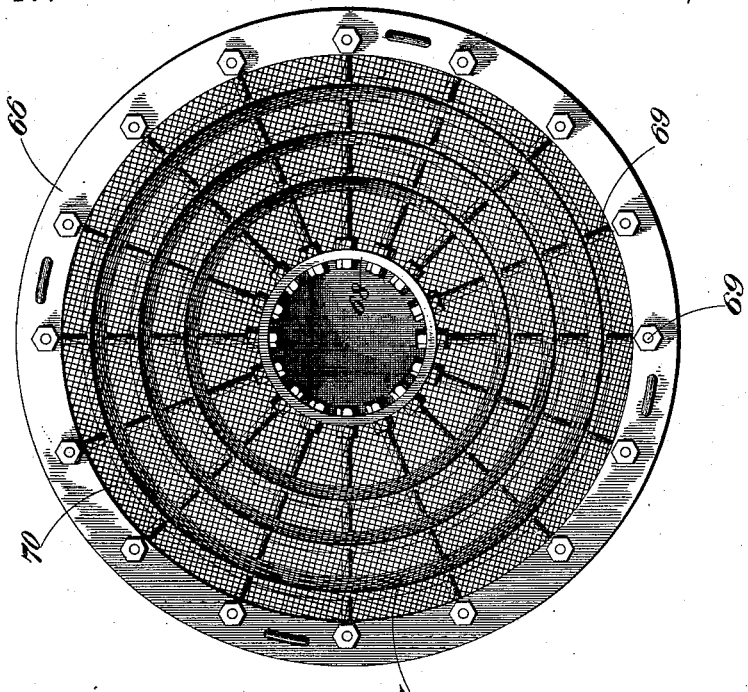
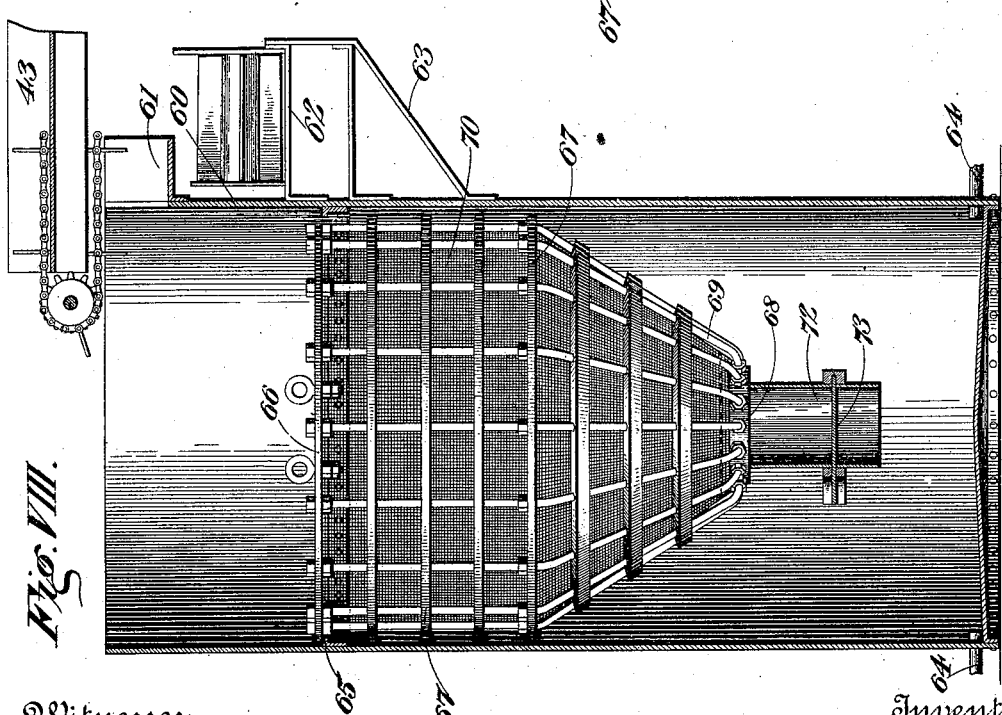
Witnesses
M. E. Fowler
S. Wacker
Inventor
Wilson E. Weatherly
By Joseph T. Stearns
Attorney.

UNITED STATES PATENT OFFICE.

WILSON EVERETT WEATHERLY, OF ALLEGHENY, PENNSYLVANIA.

PROCESS OF AND APPARATUS FOR TREATING PEANUTS.

SPECIFICATION forming part of Letters Patent No. 574,647, dated January 5, 1897.

Application filed December 16, 1895. Serial No. 572,317. (No model.)

*To all whom it may concern:*

Be it known that I, WILSON EVERETT WEATHERLY, of Allegheny, county of Allegheny, State of Pennsylvania, have invented a certain new and useful Process of and Apparatus for Treating Peanuts, of which the following is a specification, reference being had to the accompanying drawings.

The object of my invention is to effect, through an improved mode of treatment, a rapid and complete separation of peanut-kernels from the outer shells and from the thin skins which envelop the kernels and which lie next to the exterior shells.

My process may be applicable to the treatment of other varieties of nuts, and while I regard my invention as especially applicable to the treatment of the kind named I do not limit its application to the particular kind if it should hereafter appear by experiment that the qualities of other nuts render them susceptible to the successful application of my invention.

I have discovered that if the outer shell of the peanut be broken, so as to permit the escape of the kernel, and the kernel be divided, the shell, if the broken mass is placed in water, will float, but the particles of the kernel will sink. I have also noted that whole nuts or entire kernels of nuts will float in water. Taking advantage of these facts I have devised a process or method of treating the nuts to accomplish the objects above set forth, and apparatus for carrying the process into effect, all of which will more fully and at large appear in the following specification in detail, and which will be succinctly set forth in the appended claims.

In the accompanying drawings, Figure I is an end view of the dividing portion of my apparatus. Fig. II is a central vertical section of the same. Fig. III is a similar view taken at right angles thereto. Fig. IV is a plan view of a pair of the dividing-rolls detached. Fig. V is a side view of one of the dividing-roll disks on an enlarged scale. Fig. VI is an edge view of the same, showing the inclination of its teeth. Fig. VII is a view of the beater and beater-shaft detached. Fig. VIII is a central vertical section of a separating-tank with one end of the conveyer illustrated and its basket in place, the latter being shown in full lines. Fig. IX is a top plan view of the basket detached.

Referring to the figures on the drawings, 1 and 2 indicate the side frame-pieces of my apparatus, that consist, preferably, of heavy castings the weight of which is proportionate to the size and capacity of the apparatus. They are preferably united together by girders 3, the whole constituting a frame-support for side walls 4.

5 indicates the end frame-pieces of my apparatus. In suitable journals 6 and 7 in the end piece 5, between the walls 4, I mount the shafts 8 and 9 of a pair of coöperating dividing-rolls 10 and 11, respectively. I prefer to provide these rolls with a series of V-shaped channels, as illustrated, and to construct them of a series of disks 12, slipped on their respective shafts, each disk lying with its flat side against its neighbor and all of them secured in place, as by a key or spline 13.

14 and 15 indicate collars secured to the respective shafts, against which one end of the series of disks abuts, while 16 and 17 indicate an ordinary assemblage of interlocking nuts screwing upon the shafts 8 and 9, respectively, and securing the disks upon each shaft to form a compact roll. It is not sufficient as I prefer to construct the apparatus that the faces of the dividing-rolls should work sufficiently close together to crush the material fed between them, but some adequate provision must be made to insure that they will at the same time crush the kernels of the nuts and completely cut the shells which envelop the kernels, so that the latter may be readily and with certainty liberated from the former. For this purpose I provide in the angular periphery of each disk of which the rolls are severally composed and at suitable intervals apart notches 19, which define sharp cutting edges or teeth 20. The edges of opposing teeth upon each pair of rolls work shearwise against each other, and in that way insure a proper feed of the machine and the proper treatment of the nuts. In the claims I define the rolls as continuous or provided with continuous peripheries, by which I mean that the notches in the edges of the rolls do not form projections therein, but that the face of each roll in which the notches are formed is continuous, so that two rolls having their faces in actual contact may revolve independently of each other and thereby produce a cutting and crushing action, which I deem essential in the operation of my machine. The rolls 10 and 11 are located near the upper part of the walls 4. Above them are provided pieces 21, which are supported on the side walls at their upper side and have notched edges 22 at their lower side, which fit into the channels of the rolls and at the same time act as strippers for the rolls and form a hopper into which the nuts are first dumped. Below the rollers 10 and 11 I prefer to employ another set of rollers 23 and 24, corresponding in features of construction to the rolls 10 and 11, and whose shafts 25 and 26 are carried in suitable bearings 27 and 28 in the end pieces of the machine. The line of juncture between the rolls 23 and 24 is in vertical alinement with the line of juncture between the rolls 10 and 11. The purpose of the second pair of rolls is to subdivide by a second treatment the material that is passed from between the first set of rolls.

29 indicates stripper-plates located between the upper and lower sets of rolls. They are provided with opposite notched edges 30 and serve to strip the rolls and to confine the product of the rolls, so that it will drop between the second set of rolls. 31 indicates similar stripping-plates located below the second set of rolls, serving to strip the same and to guide their product into the throat 32 of a preferably cylindrical receiving sieve or screen 33.

The screen 33 is composed of a suitable frame carried between the end pieces 5 of the machine and provided with wire slats or the like 34 at proper intervals, disposed around the frame from one of the strips 31 to the other, the vacant space between the strippers defining the throat 32. Concentrically within the screen I provide a shaft 35, that is mounted in bearings 36 in the end pieces 5. To the shaft are secured at proper intervals collars 37, which carry radial arms or spokes 38 and to which are secured strips 39. The several collars, with their spokes and the strips secured to the spokes, constitute a beater by which the mass dropped from between the rolls 23 and 24 is broken up into the particles into which it has been divided by the rolls, and in that condition is forced between the slats 34 into the discharge-hopper 40, that opens into a conveyer-box 41, carried near the bottom of the end pieces 5. Within the box 41 is suitably mounted preferably an ordinary worm-conveyer 42, that conveys away the loose divided product of that portion of the apparatus to an ordinary belt-conveyer 43, for example. (See Fig. VIII.)

The manner in which the above-described apparatus is actuated may be understood by reference particularly to Figs. I and III of the drawings, in which the shaft 8 is shown as provided with a miter-gear 45 at one end, and 46 indicates a miter-gear secured to the end of the shaft 9. The gears 45 and 46 intermesh with similar gears 48 on the shaft 49 at right angles to the shafts 8 and 9. To the end of the shaft 49 is secured a driving-pulley 50. The shafts 25 and 26 are similarly operated. Upon the end of the shaft 26 is secured a sprocket-wheel 52, which is geared by a chain 53 to a sprocket-wheel 54, secured to the end of the beater-shaft 35. Another sprocket-wheel 56 is geared by a chain 57 to a sprocket-wheel 58, secured to the end of the worm-shaft 59. The material discharged by the worm 42 is taken up by the conveyer 43, which is arranged in any suitable manner to receive and discharge. The end of the conveyer 43 which is next to the worm is not illustrated, since the means of providing for the discharge of one conveyer to another may be readily, simply, and conveniently made in a variety of ways which may be devised by any mechanic to suit the conditions and arrangements of the plant with which my apparatus is equipped. The discharge end of the conveyer 43 is illustrated in Fig. VIII, in which overhangs a separating-tank 60. The tank it may be constructed of any suitable and required dimensions to suit the capacity of the apparatus and is preferably a vertically-elongated cylinder. It is provided in its upper part with a discharge-spout 61, which empties into a trough 62, supported by brackets 63 on the side of the tank 60.

64 indicates water-inlet pipes preferably located near the bottom of the tank and communicating with the interior thereof. Below the spout 61 is secured a shelf or an annular flange 65, which may be made of angle-iron and fastened by rivets to the wall of the tank. It is designed to support the upper annular rim 66 of a basket comprehending, in addition to the upper rim, intermediate annular frame-pieces 67 and a lower frame-ring 68, preferably of considerably smaller diameter than the rim 64. The upper, lower, and intermediate rings are united together by frame-rods 69 and the interior is lined with wire-cloth 70. To the ring 68 is secured a discharge-pipe 72, which is provided with a sliding gate 73, through which the contents of the basket may be discharged when required.

The operation of my apparatus is as follows: Peanuts in the natural raw state are discharged into the hopper defined above the rolls 10 and 11, which, being put in motion, divides the whole nuts by a cutting and crushing operation and discharges them to the rolls 23 and 24, where they are subjected to a further cutting and crushing operation. From between the rolls 23 and 24 they are discharged upon the revolving beater carried upon the shaft 35, by which each particle is separated, and being forced through the screen 33 they all drop in a loose mass to the worm 42, which conveys the mass of loose material to the conveyer 43. The last-named conveyer discharges its load into the tank 60, which is filled with water to the spout 61. It is there that the separation of the shells from the kernels takes place, the latter being precipitated into the basket, and the former, floating on top, are discharged from the spout 61 until the required quantity of separated nut-kernels is accumulated in the basket. Thereupon, the surface of the water being cleaned of the floating shells, the basket is removed to a drier of any suitable and ordinary construction, and there, by the operation of the gate 73, is dumped. The drying process, although constituting the last step of my process, does not relate to my particular apparatus and is therefore not illustrated. The separation of the shells and kernels will take place in the separating-tank 60 by the employment of any water, but I prefer, for carrying out my process, to employ hot water in the tank, so that the thin-skin envelops of the kernels will, when they are exposed to a dry atmosphere, separate from the kernels. When dried, the kernels and skins may be separated by any suitable winnowing or other method.

As respects my process it is obvious that the details of the special apparatus which I prefer and claim are not necessary to the carrying out of the process, however well adapted they may be for that purpose. It is sufficient, with respect to the process, that the nuts be divided, so as to free the kernels from the shells, and that they be delivered to a separating-bath.

As above stated, the separating-bath is preferably a hot one, designed to loosen the skins from the kernels. Heretofore in processes of treating peanuts to prepare the kernels ready for the extraction of their oil the method has been to employ a considerable degree of direct heat, which is sufficient to drive off prematurely some of the volatile oils, or by scorching a proportion of the kernels to impair the quality of the oil extracted from them.

By my invention all danger of burning the stock or of injuriously affecting it in any wise is avoided and the entire process of cleaning the nuts is performed accurately and effectively.

What I claim is—

1. The process of treating peanuts, or the like, which consists in dividing the nuts and afterward treating the mass of divided particles to a hot separating-bath, to separate the shells and the kernels, and afterward drying the kernels to remove their skins, substantially as set forth.

2. The process of treating peanuts, or the like, which consists in subjecting them to a cutting and crushing operation, afterward subjecting the cut and crushed mass to a hot bath for separating the shells and kernels, and finally drying the kernels to separate them from their skins, substantially as set forth.

3. In an apparatus for treating peanuts or the like, the combination with a frame and dividing-rolls provided with continuous peripheries, and having a cutting and crushing action (as distinguished from a cutting or crushing action), of a screen adapted to receive the discharge from the dividing-rolls, and a beater in connection with the screen, substantially as specified.

4. The combination with a frame and dividing-rolls provided with continuous peripheries, and having a cutting and crushing action (as distinguished from a cutting or crushing action), of a cylindrical screen adapted to receive the discharge from the rolls, and a concentric rotatory beater within the screen, substantially as specified.

5. The combination with a frame and a plurality of sets of dividing-rolls provided with continuous peripheries discharging from one to the other and having respectively a cutting and crushing action (as distinguished from a cutting or crushing action), of a screen receiving the discharge from the last set of rolls, and a beater operating to loosen the mass received from the last set of rolls and to discharge the particles thereof through the screen, substantially as specified.

6. The combination with a frame, of a hopper at one end thereof, a cylindrical screen near the other end thereof, dividing-rolls between the screen and hopper provided with continuous peripheries and having a cutting and crushing action (as distinguished from a cutting or crushing action), and stripper-plates fitting against the surfaces of the rolls and defining with the rolls a continuous discharge from the hopper to the screen, substantially as specified.

7. As a part of an apparatus for treating peanuts, a roll provided with channels defining annular angular projections, both sides of each annular projection being continuous, and notches in the edges of the projections formed in the continuous sides thereof and defining cutting and crushing teeth therein, substantially as specified.

8. As a part of an apparatus for treating peanuts, a roll consisting of a plurality of flat disks clamped together, and having continuous, wedge-shaped annular peripheries provided at intervals with teeth-defining notches whereby a cutting and crushing action is obtained in practice, substantially as set forth.

9. As a part of an apparatus for treating peanuts, the combination with a roll provided with alternating annular, angular peripheries, of a second roll similar in construction, the angular peripheries of both rolls fitting one close against the other, teeth-defining notches in the angular periphery of each roll, and each annular periphery being continuous so that each roll may revolve against the surface of its neighbor, and independently thereof, substantially as set forth.

10. As a part of an apparatus for treating peanuts, or the like, the combination with mechanism for dividing the peanuts, of a tank provided with a fluid-inlet and with a fluid-outlet at its upper end, a conveyer arranged to receive the divided peanuts from the mechanism first named and to discharge them into the tank, a removable basket within the tank designed to receive the kernels, and a second conveyer in operative proximity to the outlet of the tank and designed to convey away the hulls, substantially as specified.

11. As a part of an apparatus for treating peanuts or the like, a basket consisting of two horizontally-disposed rings of different diameters, vertical frame-pieces secured at their opposite ends to said rings, a series of horizontally-disposed rings intermediate of the first-named rings, a lining of wire-cloth and a gate-controlled discharge-pipe depending from the bottom of the basket, substantially as specified.

In testimony of all which I have hereunto subscribed my name.

WILSON EVERETT WEATHERLY.

Witnesses:
F. R. KOHEN,
A. C. HENRY.